3,215,695
2 - SULPHONYLOXYMETHYL - QUINAZOLINE-3-OXIDES, AND INTERMEDIATES THEREFOR
Heinz M. Wuest, New York, N.Y., assignor to Warner-Lambert Pharmaceutical Company, Morris Plains, N.J., a corporation of Delaware
No Drawing. Filed Mar. 27, 1964, Ser. No. 356,011
6 Claims. (Cl. 260—251)

This application is a continuation-in-part application of my copending application Serial No. 204,301, filed April 9, 1962, now U.S. Patent No. 3,138,586.

This invention relates to quinazolines. More particularly, this invention relates to 2-sulfonic acid ester-substituted quinazolines of the formula:

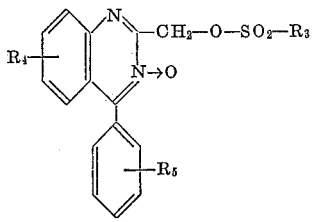

wherein $R_3$ represents a lower alkyl radical such as methyl, ethyl or propyl or an aryl radical such as phenyl or tolyl and $R_4$ and $R_5$ each represents hydrogen, halogen such as chlorine, bromine or iodine; a lower alkyl radical such as methyl or ethyl or a lower alkoxy radical such as methoxy or ethoxy. This invention also includes within its scope a novel process for the production of these quinazolines as well as intermediates useful for the production of said quinazolines.

The symbols $R_3$, $R_4$ and $R_5$ as used hereinafter have the same meaning as defined above.

The compounds of this invention are important starting materials for the production of certain 1,4-benzodiazepines. Thus, for example, 2-mesyloxymethyl-4-phenyl-6-chloroquinazoline-3-oxide may be treated with a primary aliphatic amine such as methylamine to produce a 1,4-benzodiazepine of the formula:

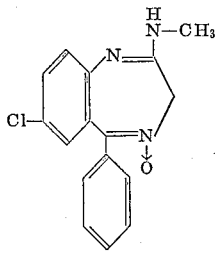

or it may be treated with a secondary amine such as dimethylamine to obtain a 1,4-benzodiazepine of the formula:

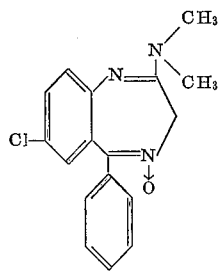

These 1,4-benzodiazepines are, of course, valuable therapeutic agents and are useful as tranquilizers or muscle relaxants. In addition, the compounds of this invention are important starting materials for other substituted quinazolines.

It has been found that the compounds of this invention may be produced in accordance with the following reaction sequence.

Step I involves the production of an alkyl or aryl substituted oxyacetyl chloride of the formula

$$R_3SO_2OCH_2COCl$$

by reacting an alkyl or aryl sulfonyl oxyacetic acid of the formula $R_3SO_2OCH_2COOH$ with an excess of thionyl chloride at a temperature of from about 70° to 80° C.

The substituted acetyl chloride thus obtained is then employed in Step II of the process which comprises adding said alkyl or aryl sulfonyl oxyacetyl chloride simultaneously with an aqueous solution of 2 N to 4 N sodium hydroxide to a solution in dioxane of a 2-amino-benzophenone oxime of the formula:

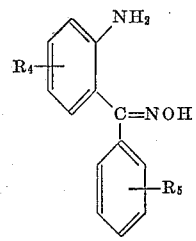

The reaction which takes place results in the formation of 2-$R_3$-sulfonyloxyacetamido-$R_4$-benzophenone oxime of the formula:

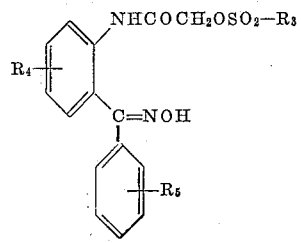

which may be cyclized by reaction with mineral acids such as sulfuric acid at 50° C. to form the corresponding 2-alkylsulfonyloxymethyl - 4-phenyl-quinazoline-3-oxides or the corresponding 2-arylsulfonyloxymethyl-4-phenyl-quinazoline-3-oxides of the formula:

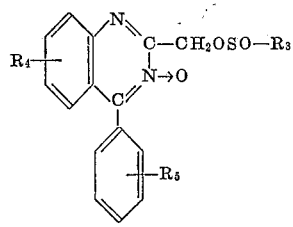

wherein, $R_3$, $R_4$ and $R_5$ are as defined.

The above described 2-$R_3$-sulfonyloxyacetamido-$R_4$-benzophenone oxime may also be cyclized without isolation from the mother liquor to form the desired end product.

The foregoing reaction steps may be conveniently represented in the following schematic diagram:

STEP I

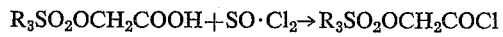

$R_3SO_2OCH_2COOH + SO \cdot Cl_2 \rightarrow R_3SO_2OCH_2COCl$

STEP II

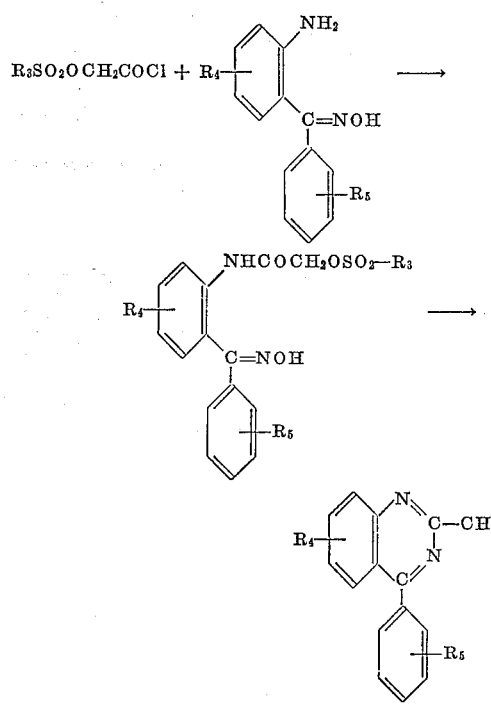

The alkyl and aryl oxyacetic acids employed as the starting material in the above process are novel compounds and methods for their preparation are described in my copending application Serial No. 185,826 filed April 9, 1962.

The following examples are included in order further to illustrate the invention.

*Example 1.—Mesyloxyacetyl chloride*

In a liter flask place 337 g. (2.18 mols) of mesyloxyacetic acid. Cautiously add 1 kg. of thionyl chloride and reflux for 3½ hours. Evaporate the excess thionyl chloride in vacuo to get about 377 g. of crude mesyloxyacetyl chloride which is used directly in the next reaction.

*Example 2.—2-mesyloxyacetamido-5-chlorobenzophenone oxime*

In an open four-liter beaker, place 394 g. (1.60 mols) of 5-chloro-2-aminobenzophenone oxime and 2.3 liters of dioxane. With good stirring and temperature maintained at 10°–15° C., add dropwise about 276 ml. of 3 N sodium hydroxide until the pH is about 7.0 and the slurry has become a two-phase liquid. At the same temperature, add dropwise and simultaneously, 310 g. (1.79 mols) of mesyloxyacetyl chloride and about 230 ml. of 3 N sodium hydroxide, so as to maintain the pH at 6.5–7.5. After the addition is complete, continue the stirring for 30 minutes and then adjust the pH to 5.0 with about 50 ml. of 4 N hydrochloric acid, and extract sequentially with one liter, 500 ml. and 300 ml. of ether. Wash the ether with four 2 liter portions of water. During these washes the product crystallizes from the ether. Filter the crystallized material, slurry the cake in methanol, filter and wash with methanol and ether to get 202 g. of 2-mesyloxyacetamido-5-chlorobenzophenone oxime in the form of yellow crystals which melt at 140°–141° C. Dry and evaporate the ethereal filtrate to give 135 g. of semi-crystalline solid. Combine to 337 g. and use directly in the next reaction.

*Example 3.—2-mesyloxymethyl-4-phenyl-6-chloroquinazoline-3-oxide*

In a 12 liter flask place 337 g. (0.88 mol) of crude 2-mesyloxyacetamido - 5 - chlorobenzophenone oxime and 7.5 liters of glacial acetic acid. When all is in solution, add 173 g. (1.76 mols) of concentrated sulfuric acid. Warm to 50° C. and then let cool to 25° C. overnight. Pour the reaction mixture into 22 liters of ice and water and stir. Filter the crystalline product and slurry with 1.5 liters of methanol. Filter and wash with methanol. Dry under vacuum at 50° C. overnight to get 200 grams of 2-mesyloxymethyl-4-phenyl-6-chloroquinazoline-3-oxide in the form of crystals which melt at 159°–162° C.

*Example 4*

A mixture of 68.4 g. of mesyloxyacetic acid and 120 g. of thionyl chloride is refluxed at 70°–80° C. for three hours. At the conclusion of this period, the excess thionyl chloride is removed in vacuo, the reaction product, mesyloxyacetyl chloride remaining in the residue. The residue of mesyloxyacetyl chloride is then added simultaneously with aqueous 4 N sodium hydroxide solution to an agitated solution of 92.0 g. of 2-amino-5-chlorobenzophenone oxime in 560 ml. of dioxane. The reaction mixture is cooled in an ice bath, the addition being made at such a rate that the temperature stays below 17° C. and the pH of the reaction mixture between 7.0–7.3. After the addition is complete, the reaction mixture is stirred for 90 minutes at pH 7.0 and then the pH is adjusted to 5 with an aqueous solution of 1 N hydrochloric acid. The reaction mixture is then extracted into ether and the ethereal solution is washed five times with water, twice with a 5% solution of sodium bicarbonate and twice more with water. The ether is then evaporated, and a crude residue of the reaction product 2-mesyloxyacetamido-5-chlorobenzophenone oxime is obtained as a viscous, red oil. The crude 2-mesyloxyacetamido-5-chlorobenzophenone oxime is dissolved in a mixture of 2500 ml. of glacial acetic acid and 54.1 g. of concentrated sulfuric acid and the resulting solution is then warmed to 50° C. and allowed to cool for 12–16 hours to a temperature of 25°–27° C. The solution is then combined with 4 liters of water and ether is added to extract the reaction product, 2-mesyloxymethyl-4-phenyl-6-chloroquinazoline-3-oxide from the aqueous mixture. The reaction product, 2-mesyloxymethyl-4-phenyl-6-chloroquinazoline-3-oxide readily crystallizes out of the ethereal solution. Upon evaporation of the ether, the crude dried product melts at 155°–156° C. Further recrystallization from a mixture containing 600 ml. ethanol and 1500 ml. of tetrahydrofuran yields purified 2-mesyloxymethyl-4-phenyl - 6 - chloroquinazoline-3-oxide which melts at 172.5° C.

*Example 5*

A mixture of 2.00 g. of mesyloxyacetic acid and 5.8 g. of thionyl chloride are refluxed together at 70°–80° C. for 90 minutes and the excess thionyl chloride is removed in vacuo. The residue contains the reaction product mesyloxyacetyl chloride. The latter is dissolved in a solution of 2.83 g. of 2-amino-5-chlorobenzophenone oxime in 16.5 ml. of acetic acid and 2.25 g. of concentrated sulfuric acid. The reaction mixture obtained is then warmed to 50° C. and alowed to cool gradually over a period of 16–18 hours. The acetic acid is then removed in vacuo and the residue which contains 2-mesyloxymethyl-4-phenyl-6-chloroquinzoline-3-oxide is dissolved in methylene chloride and washed with cold aqueous sodium carbonate and dried. The solvent is removed in vacuo and the amorphous residue is then triturated with ethanol to yield crystalline 2 - mesyloxymethyl - 4 - phenyl - 6 - chloro-quinazoline-3-oxide which melts at 164°–167° C.

It is understood that the foregoing detailed description is given merely by way of illustration and that many variations may be made therein without departing from the spirit of my invention.

Having described my invention, what I desire to secure by Letters Patent is:

1. A compound represented by the formula:

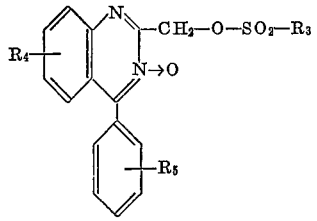

wherein $R_3$ represents a member of the group consisting of lower alkyl phenyl and tolyl groups and $R_4$ and $R_5$ each represents a member of the group consisting of hydrogen, halogen, lower alkyl and lower alkoxy.

2. 2-mesyloxymethyl-4-phenyl-6-chloroquinazoline-3-oxide.

3. 2-tosyloxymethyl-4-phenyl-6-chloroquinazoline-3-oxide.

4. A compound of the formula:

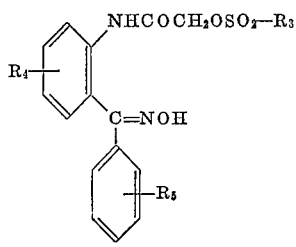

wherein $R_3$ represents a member of the group consisting of lower alkyl phenyl and tolyl and $R_4$ and $R_5$ each represents a member of the group consisting of hydrogen, halogen, lower alkyl and lower alkoxy.

5. 2-mesyloxyacetamido-5-chlorobenzophenone oxime.

6. 2-tosyloxyacetamido-5-chlorobenzophenone oxime.

References Cited by the Examiner

Sternbach et al.: J. Amer. Chem. Soc., vol. 82 (1960), pages 475-80.

NICHOLAS S. RIZZO, *Primary Examiner.*

HENRY R. JILES, *Examiner.*